United States Patent [19]

Kaiser et al.

[11] Patent Number: 5,687,329
[45] Date of Patent: Nov. 11, 1997

[54] INFORMATION HANDLING SYSTEM INCLUDING A DATA BUS MANAGEMENT UNIT, AN ADDRESS MANAGEMENT UNIT FOR ISOLATING PROCESSOR BUSES FROM I/O AND MEMORY

[75] Inventors: John Michael Kaiser; Warren Edward Maule, both of Cedar Park, Tex.

[73] Assignee: International Business Machines Corporation, Armonk, N.Y.

[21] Appl. No.: 537,185

[22] Filed: Sep. 29, 1995

[51] Int. Cl.⁶ .............................. G06F 13/00; G06F 13/38
[52] U.S. Cl. .................................... 395/308; 395/309
[58] Field of Search ................................ 395/306–309, 395/250, 821, 825, 800, 280, 281; 370/85.9

[56] References Cited

U.S. PATENT DOCUMENTS

| | | | |
|---|---|---|---|
| 4,067,059 | 1/1978 | Derchak | 395/848 |
| 4,144,562 | 3/1979 | Cooper | 395/307 |
| 4,231,084 | 10/1980 | Yoshizaki et al. | 395/825 |
| 4,855,902 | 8/1989 | Kozlik et al. | 395/281 |
| 4,956,771 | 9/1990 | Neustaedter | 395/650 |
| 5,253,353 | 10/1993 | Mogul | 395/449 |
| 5,280,590 | 1/1994 | Pleva et al. | 395/309 |
| 5,444,860 | 8/1995 | Datwyler et al. | 395/500 |
| 5,555,381 | 9/1996 | Ludwig et al. | 395/281 |
| 5,555,425 | 9/1996 | Zeller et al. | 395/800 |
| 5,566,306 | 10/1996 | Ishida | 395/309 |

*Primary Examiner*—Gopal C. Ray
*Attorney, Agent, or Firm*—George E. Clark; Jenkens & Gilchrist; Anthony V. S. England

[57] ABSTRACT

An information handling system includes one or more processing units, a data bus management unit, connected to the processor data bus, to a memory system, and to an I/O bus, an address management unit, connected to the processor address bus, to the memory system, to the I/O bus, and one or more I/O controllers, where the address and data management units isolate the processor buses from the I/O bus and the memory system.

10 Claims, 7 Drawing Sheets

INFORMATION HANDLING SYSTEM INCLUDING A DATA BUS MANAGEMENT UNIT, AN ADDRESS MANAGEMENT UNIT FOR ISOLATING PROCESSOR BUSES FROM I/O AND MEMORY

BACKGROUND OF THE INVENTION

1. Field of the Invention

The present invention relates to information handling systems, and more particularly to information handling systems having plural buses and means for translating between the plural buses.

2. Prior Art

Many state of the art computer systems use advanced processors contained on a single integrated circuit chip. Multiprocessing systems are formed by parallel connection of a group of such single chip processors to a common processor bus for higher performance. A processor bus that connects the processor chips must be structured to move signals in and out of the processors at a rate sufficiently fast (bandwidth) so as not to be the limiting factor in achieving maximum performance of the multiprocessor system.

However, in addition to the high speed processors which are attached to the processor bus, it is also necessary to attach other devices to the bus for moving information to and from any of the parallel processors. These other devices which are attached to the bus may be devices which operate at a lower speed and perhaps a lower bandwidth than the processors. It is possible that many such devices could be connected to the processor bus, and each presents bus loading and a mismatch in information transmission characteristics as between the processors and the other devices.

Additionally, the processor bus loading problem becomes more complicated when the semiconductor memory is considered. In the past, it has been desirable to connect the main memory to the processor bus since a separate interface to the processors to connect memory would require input/output pins for communication to other processors and devices, and input/output pins are severely limited in most modern chip designs.

SUMMARY OF THE INVENTION

Therefore, it is an object of the present invention to efficiently process information in a system having a processor bus, an I/O bus, and a memory bus wherein the processor bus may be asynchronous with respect to the other buses and wherein a bus isolation unit including data and address management units optimize the performance of the system, hardware costs and extendability.

Accordingly, an information handling system includes one or more processors, a processor data bus, a processor address bus, a bus isolation unit including a data management unit connected to the processor data bus, and an address management unit connected to the processor address bus, a memory subsystem connected to the bus isolation unit by a memory bus transmitting address and data, and an I/O bus connecting one or more I/O bridges to the bus isolation unit.

It is an advantage of the present invention that a complex information handling system has optimized system performance, modularity, upgradability, and cost over the prior art systems which have a single system bus.

Other features and advantages of the present invention will become apparent in the following detailed description of the preferred embodiment of the invention taken in conjunction with the accompanying drawing.

BRIEF DESCRIPTION OF THE DRAWING

FIG. 2, including FIGS. 2A, 2B, and 2C, is a block diagram of a data management unit in accordance with the present invention.

FIG. 3, including FIGS. 3A, 3B, and 3C, is a block diagram of an address management unit in accordance with the present invention.

DETAILED DESCRIPTION OF A PREFERRED EMBODIMENT OF THE INVENTION

Figure 1:
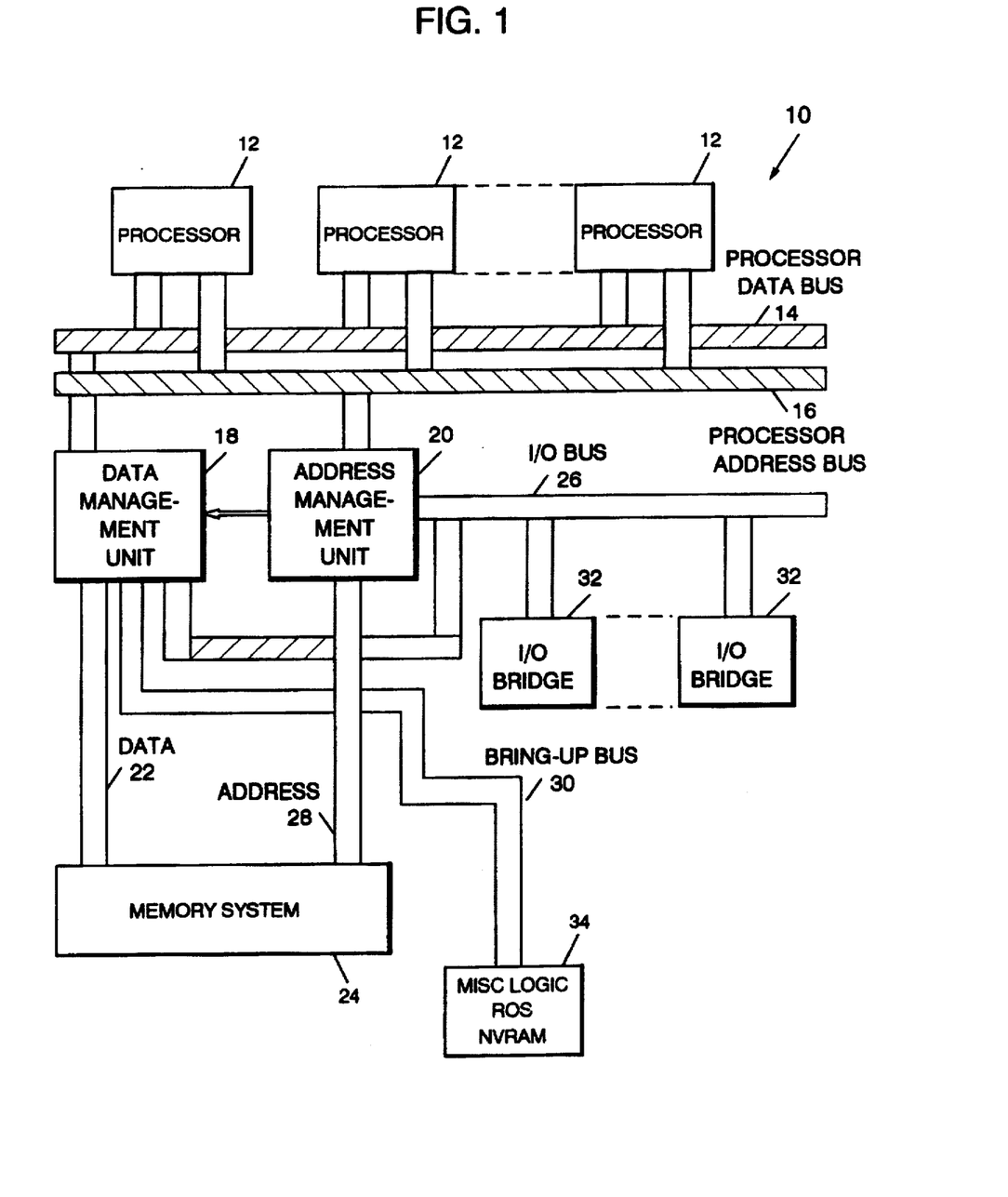
FIG. 1 is a block diagram of an information handling system implementing the present invention.

Referring now to FIG. 1, an information handling system implementing the present invention will be described.

An information handling system 10 includes one or more processing units 12, each having data outputs connected to a processor data bus 14 and having address outputs connected to a processor address bus 16. A data management unit (DMU) 18 is connected to processor data bus 14 and an address management unit (AMU) 20 is connected to processor address bus 16. Data management unit 18 is connected by memory data bus 22 to memory system 24 and by I/O bus 26 to I/O bridges 32. Address management unit 20 is connected by memory address bus 28 to memory system 24, and by I/O bus 26 to I/O bridges 32. DMU 18 and AMU 20 may be combined in a single unit as a bus isolation unit. Bring up bus 30 connects between data management unit 18 and a bring up routine storage device 34, which may be implemented as a Read Only Store or a nonvolatile RAM.

Each of the units identified above are well known in the art and will not be described in greater detail herein except for data management unit 18 and address management unit 20.

Figures 2, 2A:
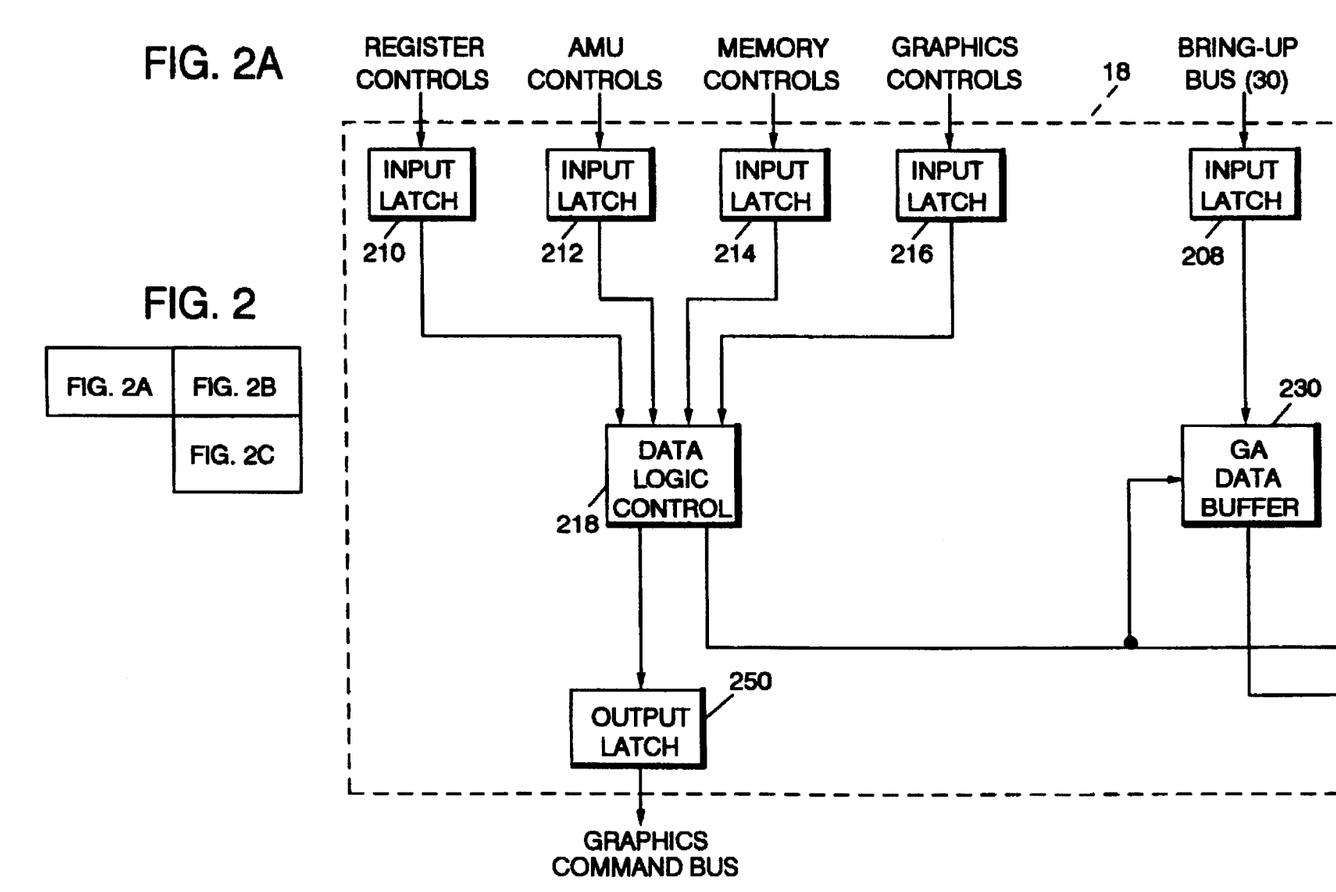
Figure 2B:
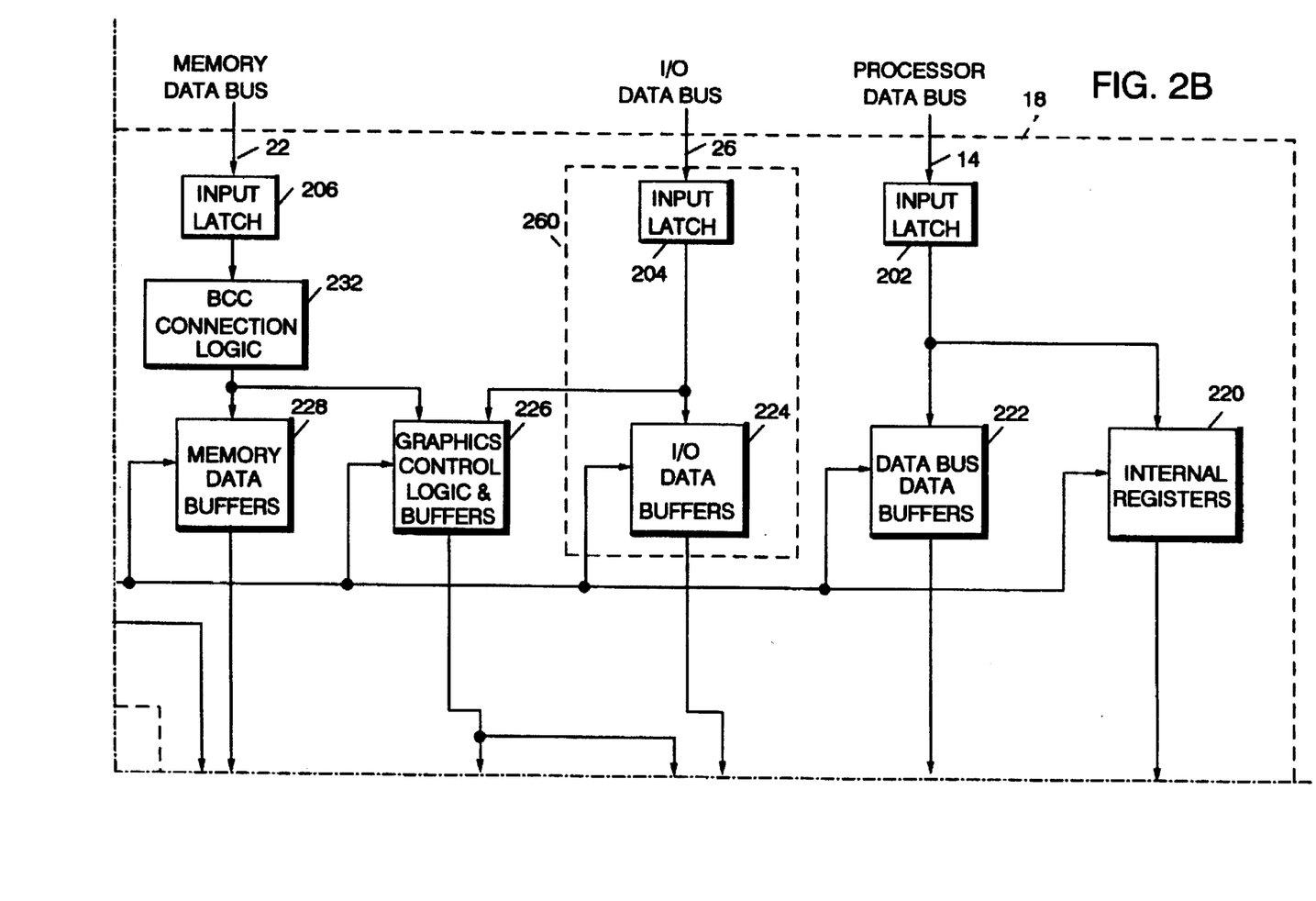
Figure 2C:
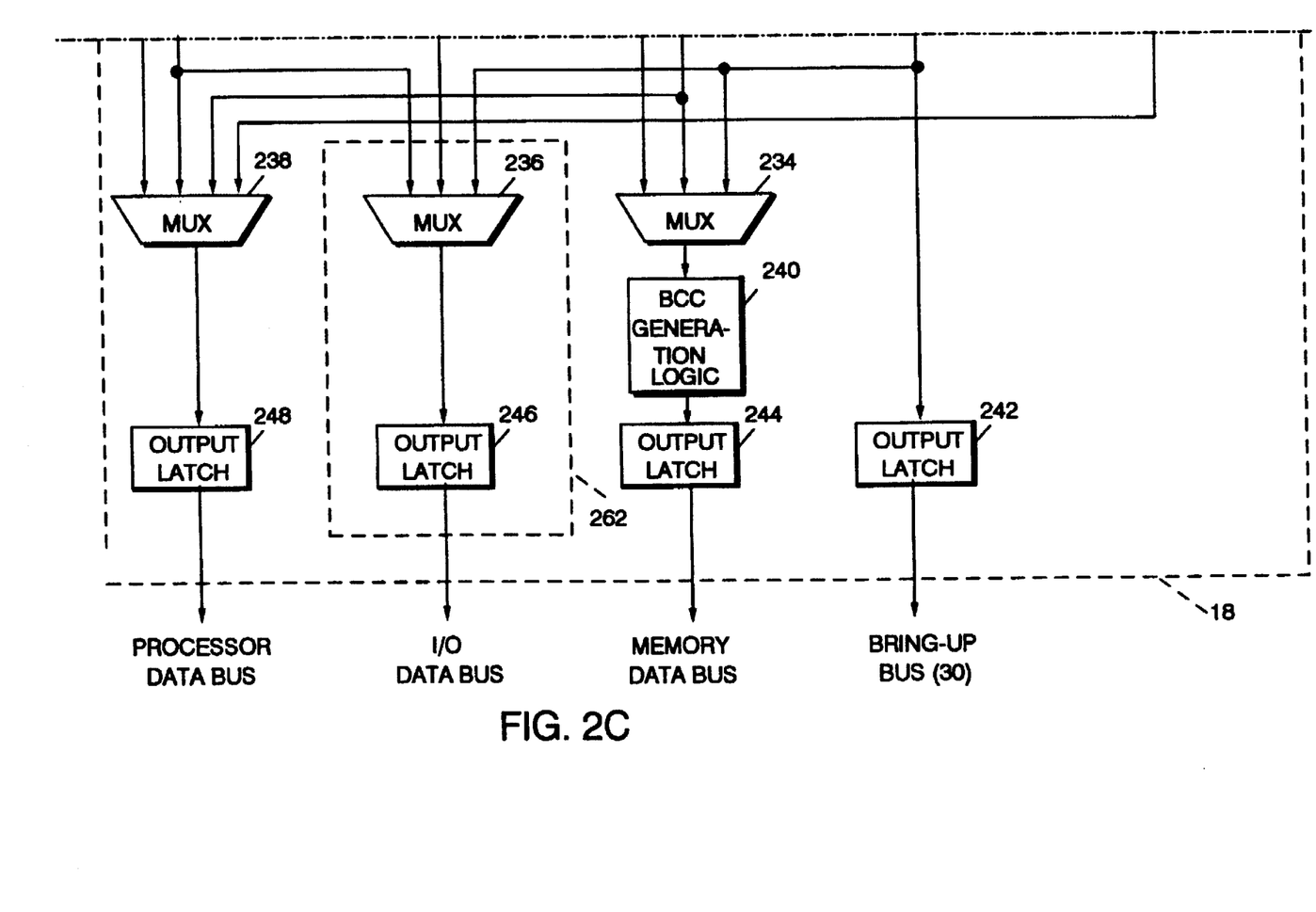

Referring now to FIG. 2, data management unit 18 will be further described.

Data management unit 18 responds to inputs from a number of buses, such as the processor data bus 14, the memory data bus 22, the I/O data bus 26, and a number of control signals generated by address management unit 20.

All of the input signals to data management unit 18 are latched in input latches as follows:

The processor data bus signals are latched at input latches 202, I/O data signals are latched at input latches 204, memory data signals are latched at input latches 206, signals from bring up bus 30 are latched at input latches 208.

The control signals from the address management unit 20 are latched as follows:

Internal register controls are stored in input latches 210, processor bus controls are stored in input latches 212, memory controls are stored in input latches 214, and graphics controls are stored in input latches 216. The outputs of the control latches 210, 212, 214, and 216, inclusive, are input to data control logic 218 which provides control signals for gating data through data management unit 18. Additionally, data control logic 218 also provides an output to output latches 250 which represent graphics commands which are then transmitted to a graphics command bus in AMU 20, latch 308.

The outputs of processor data bus latches 202 are connected to inputs of processor bus data buffers 222 and internal registers 220. The outputs of the processor data bus buffer 222 are connected to output latches 242 and to multiplexors 234 and 236. Data is gated out of buffers 222 under the control of data control logic 218. Internal registers 220 have outputs connected to inputs of multiplexor 238. Again, as indicated above, the outputs of internal registers 220 are controlled by data control logic 218.

Outputs Of I/O data latches 204 are connected to inputs of I/O data buffer 224 and graphics control logic and buffers 226. Outputs of I/O data buffers 224 are connected as inputs to multiplexor 234 and 238. Outputs of graphics control logic and buffers 226 are connected to multiplexors 234 and 236. Memory data bus input latches 206 have outputs connected to error correction code (ECC) logic 232. Outputs of ECC logic 232 are connected to memory data buffers 228 and to inputs of graphics control logic and buffers 226. Outputs of memory data buffers 228 are connected to multiplexors 236 and 238.

Bring up bus input latches 208 have outputs connected to bring up data buffer 230 which in turn has outputs connected to multiplexor 238.

As previously indicated, gating of data from registers and buffers 220, 222, 224, 226, 228, and 230 is controlled by data control logic 218. Multiplexors 234, and 236 each have three inputs and, and multiplexor 238 has four inputs, as controlled by data control logic 218, provide an output representing inputs from one of the registers or buffers 220, 222, 224, 226, 228, or 230 to the respective outputs of the multiplexors 234, 236, or 238.

More specifically, the output of multiplexor 234 is connected to ECC generation logic 240 which generates an error correction code for data to be transmitted to memory system 24 (see FIG. 1). The output of ECC generation latch 240 is connected to output latches 244 which in turn are connected to memory data bus 22. The output of multiplexor 236 is connected to output latches 246 which have outputs connected to I/O data bus 26.

Multiplexor 238 has outputs connected to output latches 248 which have outputs connected to the processor data bus 14.

The circuits and logic contained in blocks 260 and 262 which control and pass data for the I/O data bus 26 are clocked asynchronously to the processor data bus 14. A separate clock (not shown) is used to drive the I/O data on bus 26 at a clock speed which is neither synchronous to nor necessarily arithmetically related to the speed of the processor clock on processor bus 14. For example, if a processor bus clock rate is 100 Mhz, it is possible that the I/O data bus clock speed might be 32 Mhz, for example.

By isolating the processor clock from the I/O data clock through the use of the data management unit 18, transactions between processors and the data management unit may be conducted at processor speed without being slowed down by I/O requests running at a lower speed as in the prior art.

Figures 3, 3C:
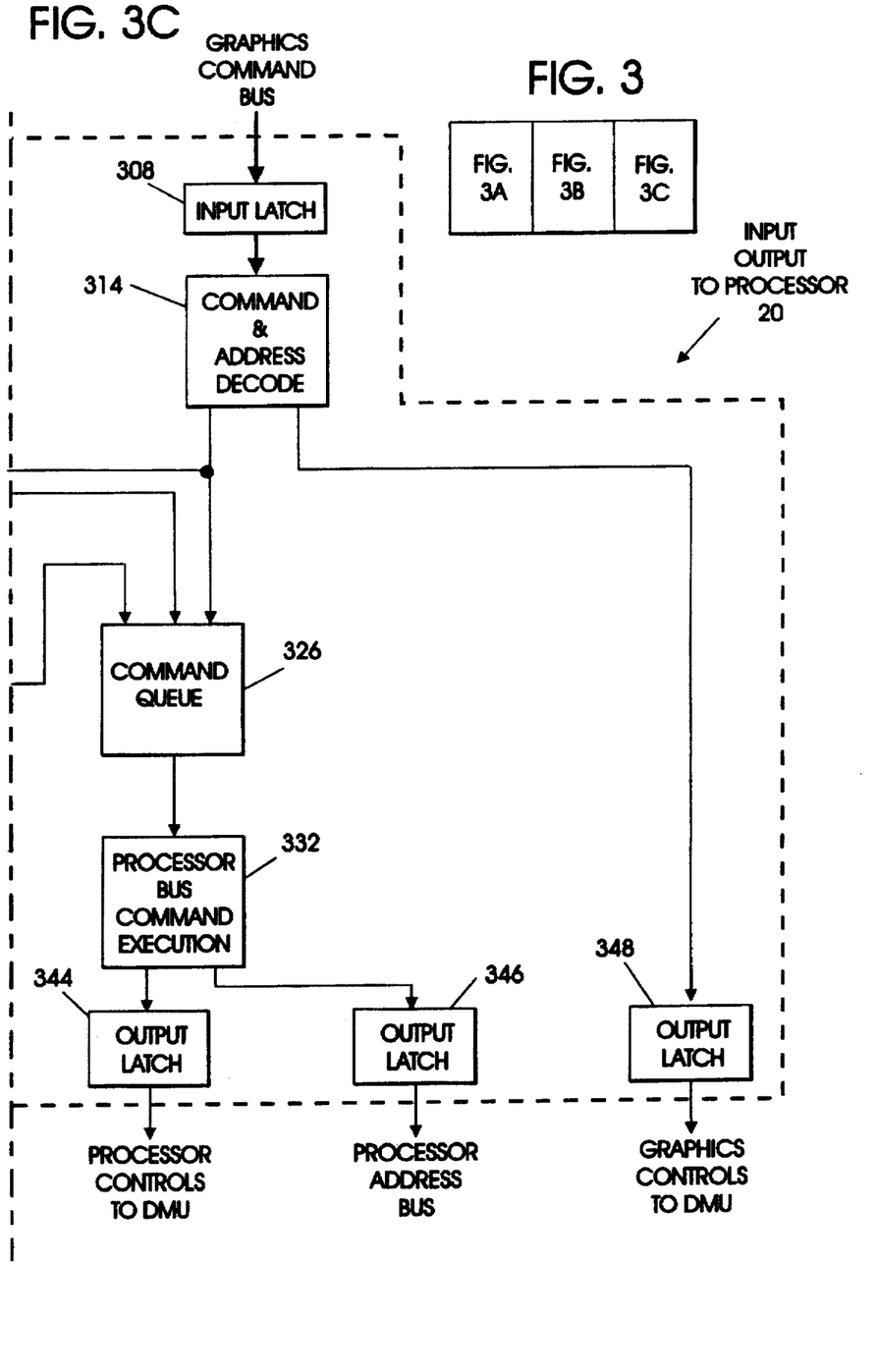
Figure 3A:
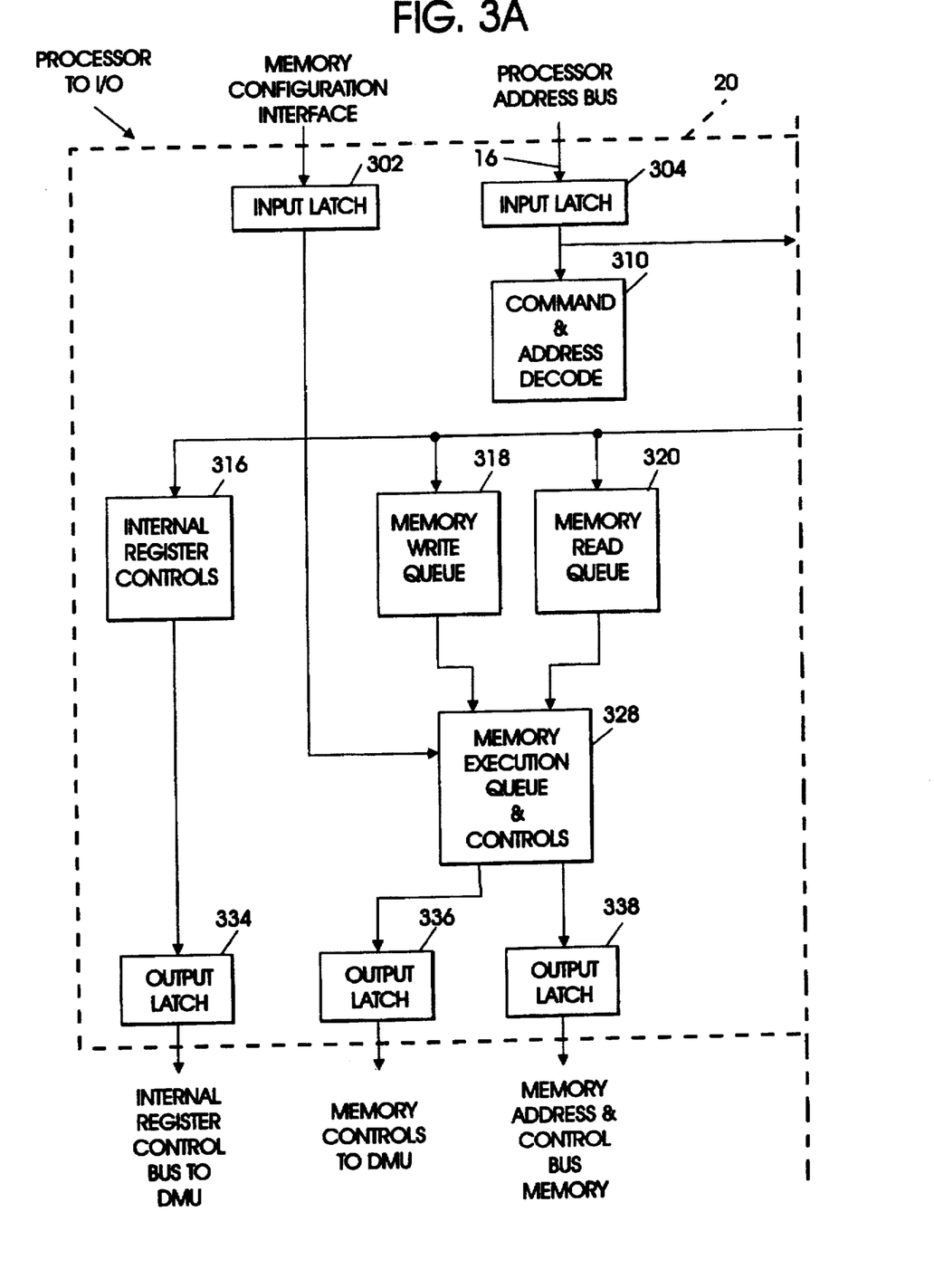
Figure 3B:
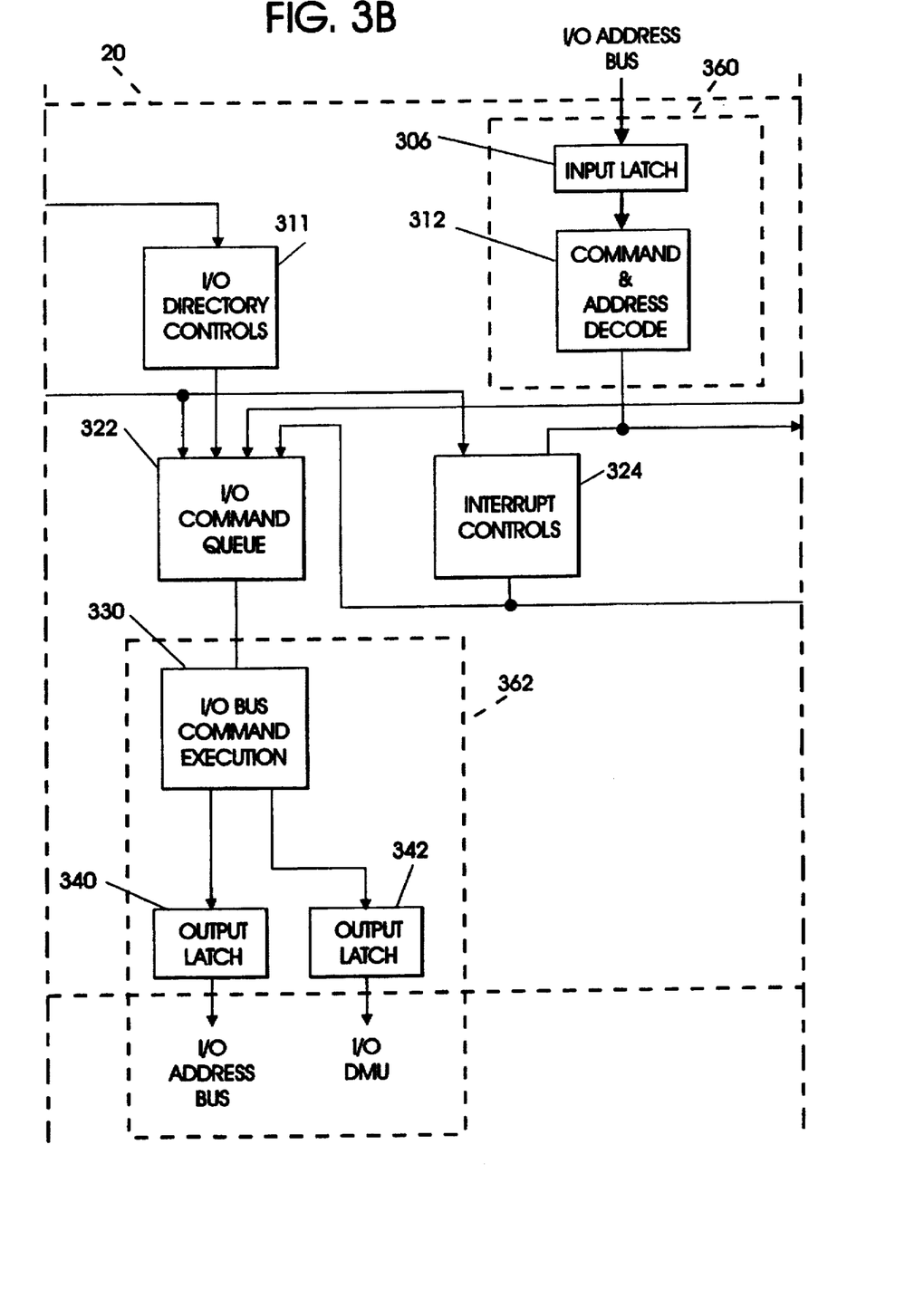

Referring now to FIG. 3, the address management unit in accordance with the present invention will be further described.

The following inputs to address management unit 20 are latched by input latches as follows:

Memory configuration interface signals are connected to input latch 302, processor address bus signals from processor address bus 16 are latched in input latches 304, I/O address signals are latched in input latches 306, and graphics command bus signals are latches in input latches 308. Outputs of input latches 302 are connected to memory execution queue and controls logic 328. Outputs from processor address bus latches 304 are connected to command and address decode logic 310 and to I/O directory control logic 311. Outputs of command and address decode logic 310 are connected as inputs to internal register controls 316, memory write queue 318, memory read queue 320, processor to I/O command queue 322, and interrupt controls 324. An output of I/O directory control logic 311 is connected to processor to I/O command queue 322.

I/O address input latches 306 have outputs connected to command and address decode logic 312. The outputs of command and address decode logic 312 are connected to inputs to interrupt control logic 324 and to I/O to processor command queue logic 326. Graphics command input latches 308 has outputs connected to command and address decode logic 314 which in turn has a first output connected to output latch 348 which generates an output signal to data management unit 18 for the graphics controls. Second outputs of command and address decode logic 314 are connected to processor to I/O command queue logic 322 and I/O to processor command queue logic 326.

Processor to I/O command queue logic 322 and I/O to processor command queue logic 326 each have a third input which is an output from interrupt control logic 324.

Outputs of internal register control logic 316 are connected to inputs of output latches 334 which provide the internal register control signal to data management unit 18. Outputs of memory write queue logic 318 and memory read queue logic 320 are connected to memory execution queue and control logic 328. Also, the outputs from input latch 302 from memory configuration interface are connected to memory execution queue and control logic 328. A first output of memory execution queue in control logic 328 is connected to output latches 336 which provide memory control signals to data management unit 18. Second outputs from memory execution queue and control logic 328 are connected to output latches 338 which provide memory address and control signals to memory 24 (see FIG. 1). Outputs of processor to I/O command queue logic 322 are connected to inputs to I/O command execution logic 330. A first output from I/O command execution logic 330 is latched in latches 340 for transmission to the I/O address bus 26. A second set of outputs from I/O command execution logic 330 is latched by latches 342 and represents the I/O control signals to be transmitted to data management unit 18. Outputs of I/O to processor command queue logic 326 are connected to processor command execution logic 332 which has a first set of outputs connected to output latches 344 which represent the processor controls to be transmitted to the data management unit 18 and a second set of outputs latched in output latches 346 which has outputs connected to the processor address bus 16.

As indicated above with respect to FIG. 2, the I/O bus 26 may operate at a frequency which is different from an asynchronous with the processor data and address buses 14 and 16. The logic included in blocks 360 and 362 related to the I/O address, commands and data as shown in FIG. 3 are operated under the control of the I/O clock referred to above with respect to FIG. 2 which is independent from the processor bus clock and runs asynchronous with respect to the processor bus clock. Thus, address, data, control signals and interrupts on the I/O bus 26 are handled under the control of data management unit 18 and address management unit 20 in such a manner so as to optimize the performance of processors 12 directly connected to processor data bus 14 and processor address bus 16.

It will be appreciated that although a specific embodiment of the present invention has been described herein for the purposes of illustration, various modifications may be made without departing from the spirit or scope of the invention.

Accordingly, the scope of this invention is limited only by the following claims and their equivalents.

What is claimed is:

1. An information handling system, comprising:

at least one processor, each processor having data inputs and outputs and address inputs and outputs;

a processor data bus, connected to the data inputs and outputs of each processor, said processor data bus operating at a first clock frequency;

a processor address bus, connected to the address inputs and outputs of each processor;

a data management unit, connected to the processor data bus, for controlling data flow to and from the processor data bus;

an address management unit, connected to the processor address bus and to an I/O bus, for controlling address information between the processor address bus and the I/O bus, the address management unit comprising;

means for decoding addresses and commands from the processor bus;

means for decoding addresses and commands from the I/O bus;

means for queuing commands decoded from the processor bus;

means for queuing commands decoded from the I/O bus;

first command execution logic for generating commands directed to the processor bus;

second command execution logic for generating commands directed to the I/O bus; and means for generating control signals for controlling data and address transmission between the processor bus and the I/O bus;

a memory system having data and address inputs and outputs, the data I/O of the memory system being connected to the data management unit, and the address I/O of the memory system being connected to the address management unit;

an said I/O bus having data lines connected to the data management unit, and address lines connected to the address management unit, said I/O bus operating at a second clock frequency; and at least one I/O controller connected to the I/O bus and to at least one I/O device.

2. An information handling system, according to claim 1, wherein said processor address bus operates at said first clock frequency.

3. An information handling system, according to claim 1, wherein said first clock frequency is asynchronous with respect to said second clock frequency.

4. An address management unit, connected to at least a first bus and a second bus, for controlling address and data transmission between the first bus and the second bus, comprising:

means for decoding addresses and commands from said first bus;

means for decoding addresses and commands from said second bus;

means for queuing commands decoded from said first bus;

means for queuing commands decoded from said second bus;

first command execution logic for generating commands directed to said first bus;

second command execution logic for generating commands directed to said second bus; and means for generating control signals for controlling data and address transmission between said first bus and said second bus.

5. An address management unit, according to claim 4, wherein said first bus comprises a processor bus, and said second bus comprises an I/O bus.

6. An address management unit, according to claim 5, further comprising means for queuing interrupts from said I/O bus to said processor bus.

7. An address management unit, according to claim 4, further comprising a first clock signal for controlling operation of said first bus, and a second clock signal for controlling operation of said second bus, said first clock signal running at a frequency and phase unrelated to a frequency and phase of said second clock signal.

8. A bus isolation unit, connected to at least a first bus and a second bus, for controlling transfer of data and address information between the first and second buses in an information handling system, comprising:

a plurality of buffer registers for buffering data signals from said first bus, data signals from said second bus, and control signals;

control logic for controlling data flow between said first bus, and said second bus;

means for decoding addresses and commands from said first bus;

means for decoding addresses and commands from said second bus;

means for queuing commands decoded from said first bus;

means for queuing commands decoded from said second bus;

first command execution logic for generating commands directed to said first bus;

second command execution logic for generating commands directed to said second bus; and means for generating said control signals for controlling data and address transmission between said first bus and said second bus.

9. A bus isolation unit, according to claim 8, wherein said first bus comprises a processor bus, and said second bus comprises an I/O bus.

10. A bus isolation unit, according to claim 8, further comprising a first clock signal for controlling operation of said first bus, and a second clock signal for controlling operation of said second bus, said first clock signal running at a frequency and phase unrelated to a frequency and phase of said second clock signal.

* * * * *